United States Patent [19]

Muramatsu et al.

[11] Patent Number: 5,045,298

[45] Date of Patent: Sep. 3, 1991

[54] CARBON MATERIAL AND PROCESS FOR PRODUCTION THEREOF

[75] Inventors: Kazuo Muramatsu, Kobe; Kazuo Inoue, Kamakura; Yoshihiko Sakashita, Kobe, all of Japan

[73] Assignee: Kabushiki Kaisha Kobe Seiko Sho, Kobe, Japan

[21] Appl. No.: 401,250

[22] Filed: Aug. 31, 1989

[30] Foreign Application Priority Data

Nov. 4, 1988 [JP] Japan .................................. 63-279078

[51] Int. Cl.$^5$ ............................................ C01B 31/02
[52] U.S. Cl. ................................... 423/445; 423/448; 423/449; 423/460; 264/29.1
[58] Field of Search ............... 423/445, 448, 449, 460; 422/127; 264/29.1

[56] References Cited

U.S. PATENT DOCUMENTS

| | | | |
|---|---|---|---|
| 2,965,931 | 12/1960 | Alden et al. | 264/29.1 |
| 3,246,056 | 4/1966 | Shea, Jr. et al. | 264/29.1 |
| 3,283,040 | 11/1966 | Stover | 264/29.1 |
| 3,405,013 | 10/1968 | Balaguer | 264/29.1 |
| 3,504,065 | 3/1970 | Edstrom | 423/449 |
| 3,917,884 | 11/1975 | Jahn | 423/449 |
| 4,117,051 | 9/1978 | Ishikawa et al. | 264/29.1 |
| 4,388,227 | 6/1983 | Kalnin | 423/460 |
| 4,399,083 | 8/1983 | Inoue | 423/449 |
| 4,716,078 | 12/1987 | Kishine et al. | 428/336 |

FOREIGN PATENT DOCUMENTS

| | | | |
|---|---|---|---|
| 121781 | 10/1984 | European Pat. Off. | 423/449 |
| 60-131816 | 7/1985 | Japan | 423/449 |
| 2127389 | 4/1984 | United Kingdom | 423/445 |

*Primary Examiner*—Olik Chaudhuri
*Assistant Examiner*—Robert M. Kunemund
*Attorney, Agent, or Firm*—Oblon, Spivak, McClelland, Maier & Neustadt

[57] ABSTRACT

A carbon material is provided which comprises spherical crystal amorphous carbon having a void diameter in the crystallite of 30 Å or below, and there is also provided a process of the production of a carbon material, in which a thermosetting resin that will be converted to amorphous carbon after using for the carbonization is molded, the molded thermosetting resin is preliminarily heated at a temperature of 1,000° to 1,900° C., and an isostatic pressure of 1,000 atmospheres or over is applied to the preliminarily heated body at a temperature of 2,050° C. or over.

7 Claims, 3 Drawing Sheets

FIG. I

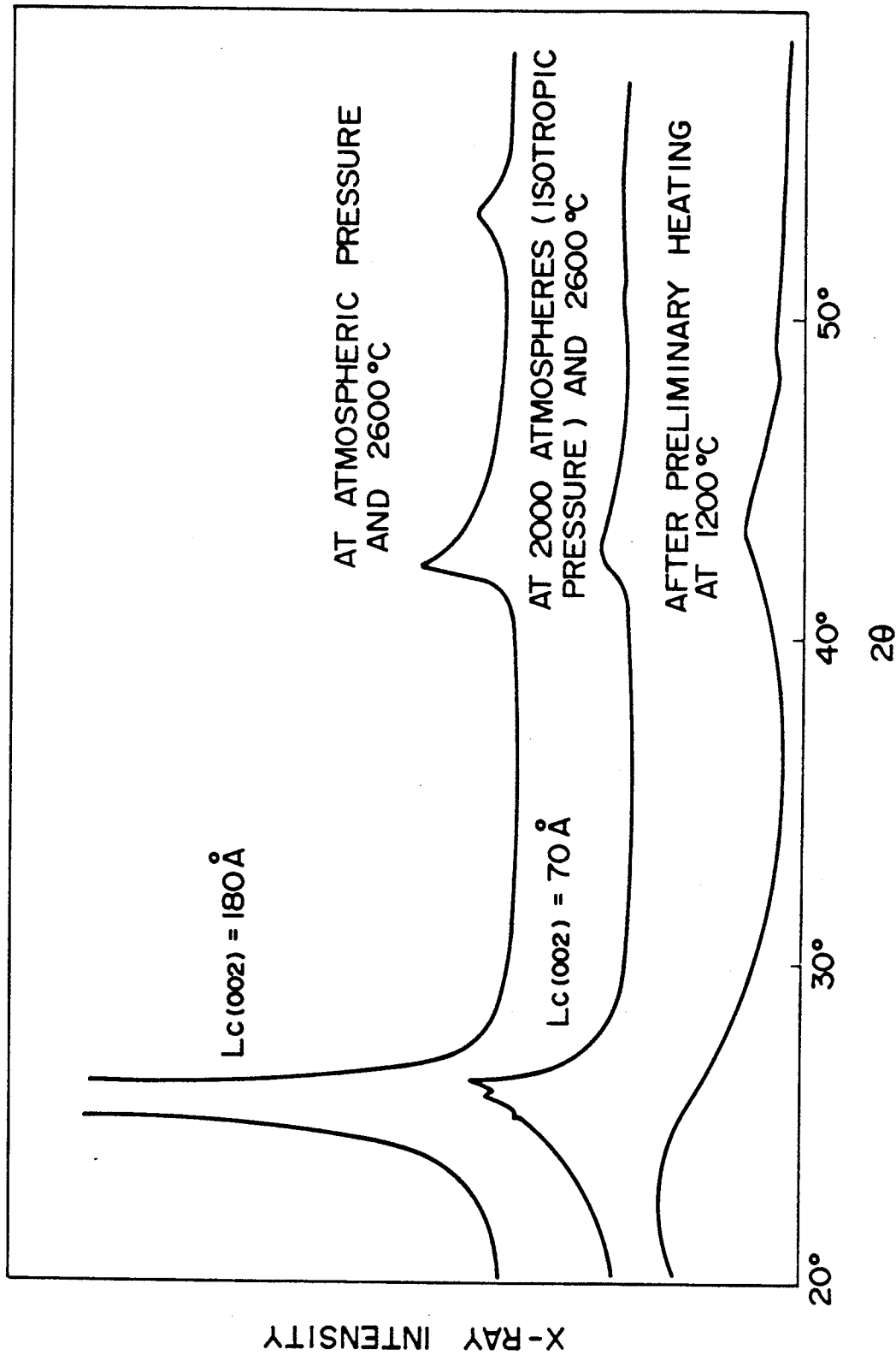

CARBON MATERIAL AND PROCESS FOR PRODUCTION THEREOF

BACKGROUND OF THE INVENTION

1. Field of the Invention

The present invention relates to a carbon material suitable for magnetic disc substrates used for magnetic discs for high density recording, molds for optical lens, or artificial heart valves, and a process of the production of the same.

2. Description of the Prior Art

With rapid progress of magnetic disc apparatuses, and with high density recording by magnetic discs used as magnetic recording mediums, improvements of properties of magnetic disc substrates are recently demanded as shown below under (1) to (5):

(1) First, with respect to the surface properties of the substrates, in order to make possible high density recording by magnetic discs, the surface accuracy should be excellent, and surface defects should be less.

(2) In order to make the followability of a magnetic head favorable, undulations of fine pitches that deteriorate the surface smoothness and the surface evenness of the magnetic recording disc substrate should be small, and the surface configuration must be free from fine projections.

(3) Since the substrate carries a magnetic medium, the chemical properties should be such that the surface treatment can be done favorably, and the substrate should be non-magnetic.

(4) The substrate should be excellent in corrosion resistance, and weather resistance, and high in strength and hardness.

(5) The substrate should have good floating properties, and should be lightweight.

Under these circumstances, instead of conventional aluminum alloy magnetic disc substrates, a high density recording magnetic disc substrate of a ceramic coated with a glass, and a high density recording magnetic disc substrate consisting of a glass plate have been developed recently. These substrates are excellent in heat resistance and corrosion resistance, and since an excellent surface accuracy can be obtained by abrading the surface, high density recording becomes possible.

However, these materials have a defect that these materials are liable to become brittle to fracture. Therefore, the materials are liable to be broken, for example, by the rotation, impact, marring, and heat shock, and thus the reliability is low.

It is conceivable to use means of increasing the braking toughness by forming a stabilizing layer at the crystal boundary, but brittle fracture cannot be prevent completely.

Since ceramic materials have higher specific gravities, in comparison to aluminum alloy substrates, they will impose a large load on a disc drive system, which makes miniaturization of the drive difficult.

In contrast, the specific gravity of carbon materials is as low as 1.5 to 2.0, and since the thermal coefficient of expansion thereof is small, the heat stability is excellent. Therefore, it is expected carbon materials are practically used, in place of the above-mentioned aluminum alloy or ceramic materials, for high density recording magnetic disc substrates.

Further, of the carbon materials, amorphous carbon has such properties that it is relatively dense, and hardly allows gases to permeate. Amorphous carbon material is conventionally produced by molding, drying, and setting a thermosetting resin, and carbonizing it at high temperature.

However, although amorphous carbon can provide a surface accuracy locally excellent by abrading the surface, in practice it is difficult to prevent the surface being formed with micro pores in the steps of the production.

This is because that although conventional amorphous carbon material has a spherical crystal structure, the void diameter in the crystallite is as high as 100 Å, and therefore when the surface is abraded, recesses having a diameter of 100 Å or over appear, and the surface after the abrasion becomes rough. Thus, when the surface accuracy is poor, improvement of the recording density of the magnetic disc cannot be expected.

Further, the reason why the surface accuracy of the conventional amorphous carbon is poor as mentioned above is that a lot of closed pores are formed in the process of the production. That is, after a thermosetting resin is molded, in the course of drying, setting and carbonizing it at high temperature it is inevitable to avoid the occurrence of closed pores due to dissipated moisture and volatile components and air, resulting in the formation of fine recesses in the surface at the time when the surface is abraded.

Therefore, in order to reduce the occurrence of the closed pores, the following methods are suggested:

(1) After a thermosetting resin that is a raw material is molded, it is set by heating at a heating rate of 1° C./hour or below, followed by carbonization.

(2) Low-boiling point materials that are by-products at the time of the setting are dispersed and dissolved perfectly in the matrix resin, and the resin is set with that dispersed state kept (Japanese Laid-Open Patent Application No. 171208/1985).

(3) After a thermosetting resin compound is heat-treated at 300° to 750° C., it is heat-treated under such conditions that the pressure is 1,000 atmospheres or over, and the temperature is 800° C. (Japanese Laid-Open Patent Application No. 36011/1987).

However, in the method (1), the period required for setting and firing that is 2 to 3 months is too long. Therefore, the production efficiency is quite low, the cost is high and it is difficult to make the method industrially and practically possible.

The method (2) has also a defect that since the adjustment, for example, the deaeration under reduced pressure, of the thermosetting resin raw material is complicated, the treatment time is long, and in addition the generated voids cannot be caused to disappear.

Thus, the yield is inevitably low, therefore in either methods, although the amorphous carbon can have fundamentally excellent properties, the production cost is high, and the amorphous carbon has not been industrially employed as general material.

Further, in the method (3), after preliminary heat-treatment at 300° to 750° C., heating is carried out under highly elevated pressure. However, when the preliminary heat-treatment temperature is at most 750° C., large amounts of H, N, O, etc. remain in the material, and gases of $H_2$, $N_2$, $O_2$, etc. are generated during the subsequent step of heating treatment under highly elevated pressure. In the industrial production, in order to lower the cost, if a batch process is used, it is required to make the apparatus large-sized to increase the number of treated products. However, if such a material is treated in a large amount, large amounts of gases of $H_2$, $O_2$, $N_2$, etc. are generated, causing problems including a risk of explosion of the generated gases, the impossible refuse of the pressurizing gas medium, and corrosion of the involved apparatus with the generated gases.

Furthermore, if thermosetting resins are heat-treated, since large amounts of $H_2O$, CO, and $CH_4$ are generated at 400° to 800° C., pores of several millimicrons are generated in a large amount. These pores almost disappear, when the thermosetting resin is heated simply to 800° C. or over, due to the shrinkage of the thermosetting resin resulted from the generated of $H_2$ (reference: Carbon. 7 (1969), pages 643 to 648). That is, these pores can be caused to disappear easily even if a pressure is not applied. However, a problem is pores that are made of air or the like which is included when the thermosetting resin is molded, and that are not caused to disappear even when it is heated in the above temperature range.

SUMMARY OF THE INVENTION

The present invention has been completed taking the above problems into consideration, and the object of the present invention is to provide a carbon material, characterized in that closed pores generated in the steps of the production including setting and carbonizing steps can be caused to disappear, the carbon material is highly dense, and the surface accuracy after the abrasion of the surface is excellent, and to provide a process of the production that can produce the carbon material rapidly.

The carbon material according to the present invention is characterized in that it comprises spherical crystal amorphous carbon having a void diameter in the crystallite of 30 Å or below.

The process of the production of the carbon material according to the present invention is characterized in that a thermosetting resin that will be converted to amorphous carbon after heating for the carbonization is molded, and the molded thermosetting resin is preliminarily heated at a temperature of 1,000° to 1,900° C., a pressure of 1,000 atmosphere or over is applied to the preliminarily heated body isostatically at a temperature of 2,050° C., or over. In this process, the preliminary heating is desirably applied at a temperature of 1500° to 1900° C., so that the residual amount of hydrogen is reduced to 100 ppm or below.

After HIP treatment, when ions are injected to the surface of the material to result in compression stresses to the surface layer, strength of the material can be enhanced. In this case, N, Ar, Cr, Fe, Ni, Cu, B, Mo, Ta and Ti can be used suitably since they do not cause corrosive reaction with magnetic films (CoNiCv, $\gamma$-$Fe_2O_3$) and are less expensive.

Alternatively, the material after HIP treatment may be brought into contact with Mn, Fe, Ni, Co, Zn, Mo, $MgCl_2$, $FeCl_2$, $FeCl_3$, $NiCl_2$, $AlCl_3$ or F, which does not cause corrosion reaction with magnetic films to form an intercalation compound with graphite at the surface of the material.

BRIEF DESCRIPTION OF THE DRAWINGS

These and other objects, as well as features of the present invention will become more apparent by reading the description referring to preferred embodiments of the invention is conjunction with the appended drawings, wherein

FIG. 3 is a graph showing an X-ray diffraction pattern.

DETAILED DESCRIPTION OF THE PREFERRED EMBODIMENTS

Figure 1:
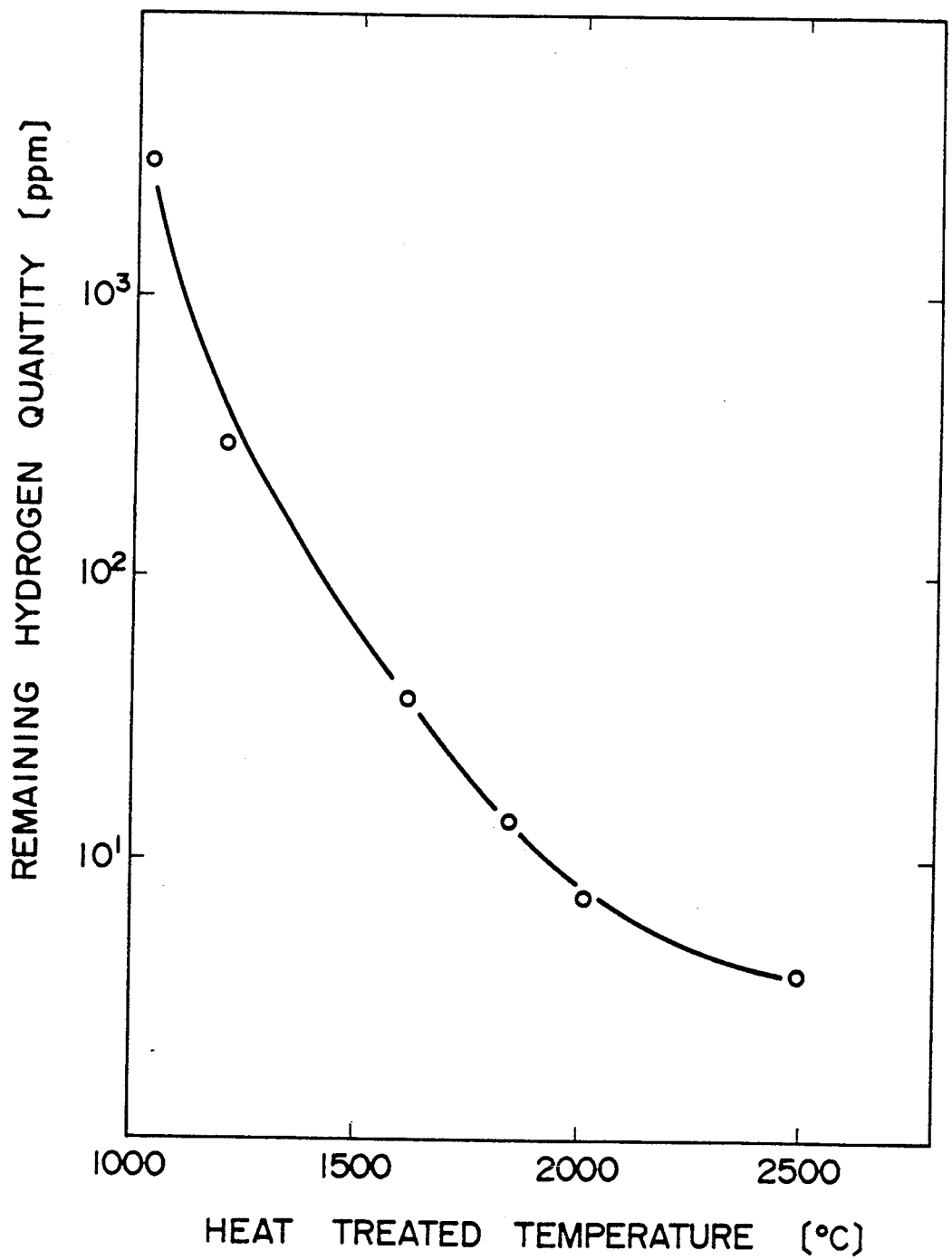
FIG. 1 is a graph showing a relationship between the temperature of the heat treatment for the resin and the residual amount of hydrogen.

Since the carbon material according to the invention limits its void diameter in the crystallite to 30 Å, the recesses after the abrasion can be made 30 Å or below. Therefore its surface roughness Ra can be adapted to the surface roughness Ra=10 to 35 that is required for high density recording magnetic discs. Further, since the void diameter is 30 Å or below, the void content becomes 0.2% or below, the crystallite size Lc (002) becomes 100 Å or below, and the apparent density becomes 1.80 or over, so that a quite high density amorphous carbon material can be obtained.

In the method according to the present invention, after a thermosetting resin is molded, the molded body is preliminarily heated at a temperature of 1,000° to 1,900° C. to eliminate gaseous components such as H, N, and O remaining in the molded body. By applying preliminary sintering at a temperature of 1,000° C. to 1,900° C., pores are eliminated in the subsequent HIP treatment to attain an intended purpose. Referring more specifically, the pores can completely be eliminated by applying preliminary sintering at a temperature of 1500° to 1900° C., thereby reducing the residual amount of hydrogen to 100 ppm or below. Then, the preliminarily heated body is heated to a temperature ranging from 2,050° to 2,600° C., and a pressure of 1,000 atmospheres or over is applied isotatically to the preliminarily heated body. Thus, amorphous carbon can be obtained wherein the closed pores that have been present in the preliminary heated body are caused to disappear, and that is high in density and can have a surface accuracy after the abrasion.

For improving the reliability against destruction upon using the material as a magnetic disc, the strength of the material can be enhanced by injecting ions to the surface of the material or forming a layer of an intercalation compound with graphite to the surface of the material after HIP treatment.

The present invention will now be described more specifically with reference to Examples.

As thermosetting resins that can become amorphous carbon after they have been heated to be carbonized, can be mentioned phenolic resins, furan resins, xylene resins, melamine resins, and aniline resins in a powdery form, and resol and novolak type phenol formaldehyde resins, furan resins, xylene resins, melamine resins, and aniline resins in a water-based or oil-based liquid form.

Using the thermosetting resins, the carbon material of the present invention is produced in the following manner.

First, the thermosetting resin is molded in known manner into a prescribed shape. For example, there is a method wherein a liquid thermosetting resin is poured into a frame to be molded. There is also a method wherein a granular thermosetting resin is cold-pressed or hot-pressed using a mold. Further, there is a method wherein in order to increase breaking toughness, carbon particles, for example, of artificial graphite, natural graphite, or carbon black are added to a thermosetting resin, and the thermosetting resin is kneaded together with an organic thickener, followed by extrusion and rolling.

Additionally stated, by the HIP treatment, closed pores are caused to disappear, but open pores do not change. Therefore, it is quite effective to melt the surface layer of the molded body by hot-pressing thereby making the surface layer dense.

Then, after the thermosetting resin molded body is dried, it is heated to a temperature of 1,000 to 1900, desirably, 1,500° to 1,900° C., in an atmosphere of inert gas such as $N_2$ or Ar gas to be preliminarily heated, so that the amount of the residual hydrogen is reduced to 100 ppm or below.

The reason why the thermosetting resin is preliminarily heated at a temperature of 1,000° to 1,900° C. is that when it is heated to 1,000° C. or over, remaining gaseous components such as H, N, and O in the molded body can be reduced considerably. FIG. 1 is a graph wherein the heat treatment temperature of a phenol formaldehyde resin are plotted along the abscissa and the remaining hydrogen amounts are plotted along the ordinate so that the relationship between them may be shown. As apparent from FIG. 1, at a heat treatment temperature as low as about 700° C., the remaining hydrogen amount is $10^4$ to $10^3$ ppm which is quite high, but at a heat treatment temperature of 1,000° C. or higher, the remaining hydrogen amount is remarkably reduced to $10^3$ ppm or below. Concerning other gaseous components such as nitrogen and oxygen, the situation is similar to the above.

On the other hand, when the molded body is heat-treated at a temperature exceeding 2,000° C., the crystallization progresses, and therefore even if an isostactic pressure is applied to the molded body in the subsequent step, the material would not be made dense. The reason why the temperature for the preliminary sintering is defined as 1,500° C. to 1,900° C. is that a crystalline layer of graphite is deposited in the pores upon HIP treatment if the preliminary sintering temperature is from 1,000° to 1,500° C. In this case, although the pores are eliminated from a physical point of view, abnormal growth of media is caused on the deposited crystalline layer to bring about recording errors. On the other hand, if the residual amount of hydrogen is reduced to 100 ppm or below at a preliminary sintering temperature of 1,500° to 1,900° C., since the pores are eliminated with no deposition of the graphite crystalline layer, the number of recording errors is reduced to such a level as allowing practical use. For these reasons, the preliminary heating temperature is set at 1,000° to 1,900° C. and, preferably, 1,500° to 1,900° C.

Then, the material after the preliminary heating is heated to a temperature ranging from 2,050° to 2,600° C., and an isotactic pressure of 1,000 atmospheres or over is applied to make the material dense. This isotropic pressing treatment can be carried out by a HIP isostatic apparatus.

By pressing the preliminary heated material at a temperature of 2,050° C., closed pores present in the preliminary heated body disappear. Although the material is thus made dense, if the temperature is less than 2,050° C., the closed pores would not disappear even if a higher pressure is applied. If the temperature is as high as 2,500° to 2,600° C., the densening effect reaches saturation, and therefore it is useless if the heating is effected at a temperature exceeding such a temperature.

Further, if the applied pressure is less than 1,000 atmospheres, closed pores do not disappear sufficiently, and the densening can not proceed. Therefore, it is required that the pressure is 1,000 atmospheres or over.

Figure 2:
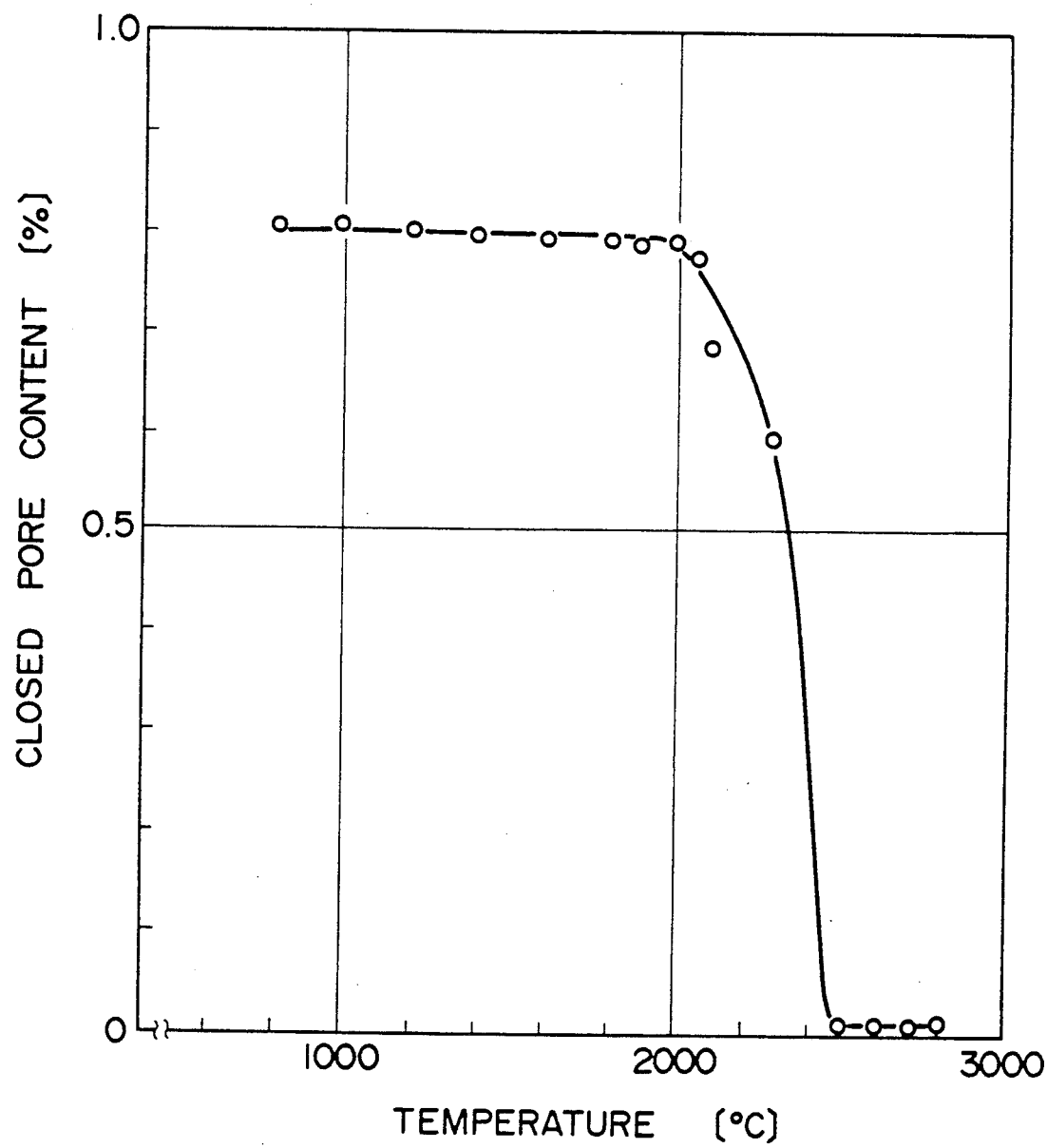
FIG. 2 is a graph showing a relationship between the temperature of the HIP treatment and the porosity of closed pores.

FIG. 2 is a graph wherein temperatures are plotted along the abscissa, and closed pore contents are plotted along the ordinate, and that shows changes in closed pore content that were obtained when a phenol formaldehyde resin was preliminarily heated at 1,200° C., and the was then heat-treated under an isostatic pressure of 2,000 atmospheres by the HIP. When the temperature is 2,050° C. or over, the closed pore content lowers to cause the densening to take place, and at a heating temperature of 2,500° C., the closed pore content becomes substantially zero. Thus to cause the densening to take place, it is required that an isostatic pressure is applied to the preliminary heated body. Under an isostatic pressure, crystal growth of the graphite crystals is suppressed, and with the amorphous state kept, plastic deformation takes place in the above temperature range and the densening proceeds. Under atmospheric pressure or an anisostatic pressure by monoaxial pressing in such a case of hot-pressing, if heating is effected in the temperature range of 2,000° C. or over, crystal growth of graphite crystals takes place, and shrinkage in one direction occurs, leading to an increase in voids.

FIG. 3 shows X-ray diffraction patterns that were obtained by preliminarily heating a phenol formaldehyde resin at 1,200° C., and then heat-treating it at 2,600° C. under atmospheric pressure and an isotropic pressure. In the figure, crystallite parameters Lc (002) determined by Gakujutsu Shinkokai-ho (established by Nihon Gakujutsu Shinkokai 117 Iinkai; reference: Carbon 36 (1963), page 25) are also shown. FIG. 3 also shows an X-ray diffraction pattern of a sample that had been preliminarily heated at 1,200° C. but had not been subjected to the HIP treatment. By heating at 2,600° C. under atmospheric pressure, the graphitization proceeds, thereby 002 and 004 diffraction lines appear strongly, and Lc (002) grows to about 200 A. However, under an isostatic pressure the diffraction line is very weak, and broad, and the graphitization is impeded, and the amorphous state is kept. Therefore, in the present invention, the preliminarily heated body is heated at a temperature of 2,050° C., and an isostactic of 1,000 atmospheres or over is applied.

According to the present invention, a thermosetting resin is molded, the molded body is heated to a temperature of 1,000 to 1,900, and, preferably, 1,500° to 1,900° C. to be fired preliminarily, and then a pressure of 1,000 atmospheres or over is applied isostatically at a temperature of 2,050° to 2,600° C. to make it dense. As a result, the obtained high density amorphous carbon material has a void diameter in the crystallite 30 A or below, an apparent specific gravity of 1.8 or over, a bulk specific gravity of 1.7 or over, an closed pore content of substantially 0%, and a bending strength of 1,800 kgf/cm$^2$ or over that is rather high, which means that the high density amorphous carbon material has properties required for high density recording magnetic disc substrates.

In order to improve the reliability against destruction upon using the material as a magnetic disc, (1) an intercalation compound graphite with at least one of Mn, Fe, Ni, Co, Mo, $MgCl_2$, $FeCl_2$, $FeCl_3$, $NiCl_2$, and $AlCl_3$ is formed or (2) ions selected from N, Ar, Cr, Fe, Ni, Cu, Mo, Ta, B and Ti are injected by means of ion injection (ion plating), etc. to form a compressive stress layer to the surface of the material after HIP treatment. Since amorphous carbon shows behavior of brittle fracture in which fine cracks at the surface layer leads to the material destruction, but the introduction of the compressive stress layer to the surface can avoid the formation of the fine cracks at the surface layer to improve the strength of the material.

In the present method, when heating treatment for carbonization at high temperatures and high pressures is effected as described above, closed pores present inside disappear, and a high density and high strength carbon material is obtained. Therefore, a carbon material whose surface accuracy will become excellent by abrading the surface can be obtained, and in the case of the magnetic disc that uses this carbon material, a magnetic head can float stably, so that stable recording properties can be secured. In addition, since the substrate surface is free from projections and recesses that will cause the magnetic thin film to be defective, the magnetic properties are stable, and since the carbon material is lightweight, the load on the drive system is little.

Further, the carbon material according to the present invention exhibits enough mechanical strength in the steps of its production including steps of machining, and abrading, and at the time when a magnetic disc using the carbon material is rotated at a high speed. Thus, when the carbon material according to the present invention is applied to a magnetic disc substrate, the substrate is provided with enough properties required for a substrate used for a high density recording magnetic disc.

In the present method, even though pores are generated at the time of preliminary heating, since the material is made dense by firing treatment for carbonization at high temperature and high pressures by the HIP or the like mentioned above, the heating rate at the time of preliminary heating can be increased, and since gases such as $H_2$, $O_2$, and $N_2$ at the time of the HIP treatment are generated little, a large amount of raw material can be processed to produce a carbon material to reduce the production cost significantly.

Then, descriptions of the actual production of a carbon material according to the present invention and the results of the measurements of the properties of the product will be explained below.

EXAMPLE 1

A water-soluble phenol formaldehyde resin was poured into a disc-like mold having a diameter of 120 mm, and a thickness of 4 mm, was kept at 50° C. for 10 hours, then was kept at 80° C. for 5 hours, and then was kept at 100° C. for 5 hours to set. Then the temperature was elevated at a heating rate of 5° C./hr. under a nitrogen gas atmosphere effect the pre-heating. By using HIP apparatus, an isostatic pressure of 2,000 atmospheres was then applied to the sample obtained by the preliminary heating with it being heated to 2,500° C. thereby making it dense. Physical properties before the densening treatment (after the preliminary heating) and after the densening treatment (after the HIP treatment) are shown in Table 1 below.

EXAMPLE 2

A powder of a phenol formaldehyde resin having an average particle diameter of 30 μm was hot-pressed using a mold into a disc having a diameter of 120 mm, and a thickness of 3 mm. The hot pressing was carried out for 20 min under such conditions that the temperature was 120° C., and the surface pressure was 20 kgf/cm². The pressed sample was preliminarily heated and made dense in the same way as in Example 1.

EXAMPLE 3

In the same manner as in Example 2, each of the material molded by hot-pressing was preliminarily heated to 1,200° C. and 1,500° C. and then applied with HIP treatment under a pressure of 2000 atm. and at a temperature of 2,500° C.

The physical property of the material after the treatment and recording error after sputtering CoNiCr media are shown in Table 3.

EXAMPLE 4

In the same manner as in Example 2, the material molded by hot-pressing was preliminary sintered at 1,500° C. and then applied with HIP treatment under a pressure of 2000 atm and at a temperature of 2500° C. The material after the treatment was subjected to strengthening treatment by the following method:

(1) $Ar^-$ ions were spiked at a dose of $2 \times 10^{17}$ ions/cm² under an acceleration energy of 15 KeV using an ion injection device.

(2) The material was brought into contact with $FeCl_3$ vapors under vacuum of $10^{-3}$ Torr and at a temperature of 280° C. to form a graphite-$FeCl_3$ intercalation compound layer of about 20 μm thickness at the surface.

The bending strength for the materials (1), (2) are shown in comparison with that of not-treated material in Table 4.

Physical properties before and after the densening treatment are also shown in Table 1 below.

As apparent from Table 1, in either case of Example 1 and 2, after the HIP treatment, the closed pore content is 0%, the bulk specific density if 1.7 or over, and the bending strength is kept at as high as 900 kgf/cm² or over.

The surfaces of the molded bodies obtained in Examples 1 and 2 were abraded by a fine lapping machine to produce substrates for magnetic discs having a thickness of 1.3 mm and a diameter of 90 mm.

Table 2 below shows the measured values of properties of the substrates for magnetic discs that are compared with those of properties of Conventional Example (a commerically available aluminum substrate).

In Table 2, the parallelism indicates the smoothness in a diametrical direction of the substrate, the concentricity indicates the deviation between the central point of the outer circle of the substrate and the central point of the inner circle, the TIR indicates the overall undulation, and the ACC indicates fine defective state of the substrate surface. The surface roughness (average roughness Ra) indicates the smoothness of the substrate surface.

As apparent from Table 2, the substrates of Example 1 and Example 2 are excellent in properties as substrates for magnetic discs in comparison to the Al substrate of Conventional Example.

According to the present invention, a carbon material excellent in surface accuracy, light in weight, low in coefficient of thermal expansion and excellent in heat resistance and corrosion resistance can be obtained. Also, according to the present invention, a carbon material having such excellent properties can be produced rapidly.

The density carbon material obtained according to the present invention is suitable for a substrate for high density recording magnetic discs, and also is quite effective for members wherein excellent surface accuracy and denseness are required such as an optical lens mold and an artificial heart valve.

TABLE 1

| physical property | Example 1 | | Example 2 | |
|---|---|---|---|---|
| | After preliminary heating | After HIP treatment | After preliminary heating | After HIP treatment |
| Apparent specific gravity | 1.44 | 1.80 | 1.49 | 1.83 |
| Bulk specific gravity | 1.42 | 1.76 | 1.46 | 1.80 |
| Closed pore content in % | 1.5 | 0 | 0.8 | 0 |
| Bend strength in kgf/cm² | 950 | 1200 | 1100 | 1500 |

TABLE 2

| | Property | | | | |
|---|---|---|---|---|---|
| | Dimensions | | Strain | | Surface roughness |
| | Pallalelism in mm | Concentricity in mm | TIR in μm | ACC in mm sec² | (average roughness Ra) in Å |
| Example 1 | 0.014 | 0.03 | 10 | 8 | 35 |
| Example 2 | 0.013 | 0.03 | 5 | 5 | 30 |
| Conventional Example: Al substrate | 0.022 | 0.05 | 15 | 18 | 150 |

TABLE 3

| physical property | Pre-Heat treatment temperature (°C.) | |
|---|---|---|
| | 1200 | 1500 |
| Apparent specific gravity | 1.83 | 1.83 |
| Closed pore content (%) | 0 | 0 |
| Bending strength (kgf/cm2) | 1100 | 1500 |
| Number of recoding error (1φ3.5 inch) | 500 | 10 |

TABLE 4

| | before treatment | after reinforcement treatment | |
|---|---|---|---|
| | | 1 Ar ion | 2 K |
| Bending strength (kgf/cm²) | 1500 | 1900 | 1800 |

What is claimed is:

1. A carbon material comprising amorphous carbon containing spherical crystals having a void diameter, in the crystallite structure, of 30 Å or below and apparent specific gravity of 1.80 or over.

2. A carbon material as defined in claim 1, wherein a compressive stress layer is formed to the surface of said carbon material by injecting at least one of elements selected from the group consisting of N, Ar, Cr, Fe, Ni, B Cu, Mo, Ta and Ti.

3. A carbon material as defined in claim 1, wherein a layer of an intercalation compound comprising at least one of elements selected from the group consisting of Mn, Fe, Ni, Co, Zn, Mo, MgCl₂, FeCl₂, FeCl₃, NiCl₂, AlCl₃ and F, and graphite is formed to the surface of said carbon material.

4. A process of producing a carbon material which comprises the steps of:
   (a) molding a thermosetting resin which will be converted to an amorphous carbon by firing for carbonization,
   (b) preliminarily heating said molded thermosetting resin at a temperature of 1000° to 1900° C. to prepare a heated body, and
   (c) applying an isostatic pressure of not less than 1000 atm to said heated body at a temperature of not less than 2050° C.

5. A process as defined in claim 4, wherein the molded thermosetting resin is preliminarily heated at a temperature of 1,500° to 1,900° C., so that the remaining hydrogen amount is reduced to 100 ppm or below.

6. A process as defined in claim 4, further comprising the step of injecting at least one element selected from the group consisting of N, Ar, Cr, Fe, Ni, Cu, Mo, Ta, B and Ti to the surface of the carbon material obtained by applying isostatic pressure, thereby forming a compressive stress layer to the surface of said carbon material.

7. A process as defined in claim 4, further comprising the step of bringing the carbon material obtained by applying isostatic pressing into contact with at least one element selected from the group consisting of Mn, Fe, Ni, Co, Zn, Mo, MgCl₂, FeCl₂, FeCl₃, NiCl₂, AlCl₃ and F, thereby forming a layer of intercalation compound with graphite to the surface of said carbon material.

* * * * *